United States Patent Office 3,284,200
Patented Nov. 8, 1966

---

3,284,200
3-PYRAZOLIDONE DEVELOPERS
Geoffrey Ernest Ficken, Ilford, Essex, England, assignor to Ilford Limited, Ilford, England, a British company
No Drawing. Filed May 20, 1963, Ser. No. 281,802
Claims priority, application Great Britain, June 7, 1962, 22,157/62
6 Claims. (Cl. 96—66)

This invention relates to new 3-pyrazolidone compounds and to photographic developing compositions containing the same.

In British Patent No. 542,502 there are described, as photographical developing substances, 3-pyrazolidones of the general Formula I:

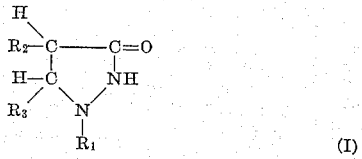

wherein $R_1$, $R_2$ and $R_3$ are hydrogen, alkyl, aryl or aralkyl groups. One such compound, 1-phenyl-3-pyrazalidone, has been very widely used in practice.

It has now been found that compounds of the foregoing type, in which $R_1$ is aryl and in which the 4 and 5 positions of the pyrazolidone ring are bridged by a cycloaliphatic substituent, are also very valuable photographical developing agents having, for some purposes, distinct advantages. In particular it is found that they have a substantially higher resistance to hydrolysis on keeping.

According to a first feature of the present invention, therefore, there are provided compounds of the general formula II:

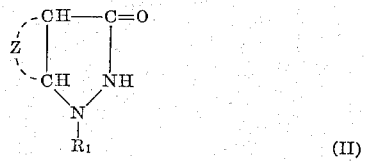

wherin Z is a divalent aliphatic grouping which, with the carbon atoms in 4 and 5 postions of the pyrazolidone ring, completes a five-membered or six-membered cycloaliphatic ring and $R_1$ is an aryl group e.g., phenyl or naphthyl group. Such aryl groups may be substituted with hydroxy, alkoxy, oxyalkyl, amino, substituted amino, nitro, sulphonic or carboxylic groups or halogen atoms.

The aforesaid compounds of general Formula II may be made by any of the methods known per se for the production of the corresponding compounds of general Formula I, with the variant that in the starting materials the groups $R_2$ and $R_3$ are replaced by the grouping Z as defined. Such proceses are described, for axample, in British Patent Nos. 542,502, 679,677, 679,678, 703,669 and 728,368. More specifically, the following general methods are preferred:

A. By condensing a hydrazine of the general formula $R_1NH\ NH_2$ with an ester of the general formula:

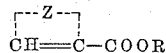

where R is a hydrocarbon group.

B. By condensing a hydrazine of the general formula $R_1NH\ NH_2$ with an amide of the general formula:

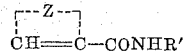

where R′ is a hydrogen atom or hydrocarbon group.

The following examples will serve to illustrate the invention:

*Example 1.—1-phenyl-4,5-tetramethylene-3-pyrazolidone*

A solution of sodium (7.5 g.) in ethanol (150 ml.) was treated successivley with phenylhyrazine (25 ml.) and ethyl cyclohexene-1-carboxylate (38.3 g.), and the mixture was refluxed for 18 hours. After removal of the solvent under reduced pressure, the residue was refluxed for 3 hours with a mixture of concentrated hydrochloric acid (200 ml.) and water (100 ml.). The mixture was cooled, and the solid was collected, washed with dilute ammonia solution, and dried. Crystallisation from ethyl acetate, and then from a mixture of cyclohexane and benzene gave 1-phenyl-4,5-tetramethylene-3-pyrazolidone as cream-coloured crystals, M. Pt. 161–162° C.

*Example 2.—1-phenyl-4,5-trimethylene-3-pyrazolidone*

Phenylhydrazine (5.3 ml.) and cyclopentene-1-carboxamide (5.9 g.) were added to a solution of sodium (1.6 g.) in ethanol (30 ml.), and the mixture was refluxed for 16 hours. The solid which separated was filtered off after cooling, and washed successively with a little cold ethanol and ether. A solution of this solid in water (40 ml.) was acidified with concentrated hydrocholoric acid, when a tarry solid seperated. This slowly hardened, and was collected, was washed with a little cold water, and crystallized from water to give the pyrazolidone as colourless needles, M. Pt. 129–130° C.

*Example 3.—1-m-chlorphenyl-4,5-tetramethylene-3-pyrazolidone*

A solution of sodium (3.0 g.) in ethanol (100 ml.) was refluxed for 16 hours with m-chlorophenylhydrazine (14.3 g.) and ethyl cyclohexene-1-carboxylate (15.4 g.). After cooling, the solid was collected and treated in water (80 ml.) with acetic acid. The oil which separated was taken up in chloroform, and the dried (sodium sulphate) extract was distilled, the fraction boiling at 110–160°/2 mm. being collected.

A solution of the distillate in the minimum of warm benzene was treated with light petroleum (B. Pt. 60–80° C.) and cooled. The solid which separated was collected and crystallised from cyclohexane, and then recrystallised from an ethanol-water mixture, the pyrazolidone being obtained as colourless plates, M. Pt. 145–147° C.

The compounds of general Formula II may be employed in the same manner as the compounds of British Patent No. 542,502. They exhibit the property known as "superadditivity" when used in association with other developing agents, e.g. hydroquinone or p-hydroxyphenyl glycine.

The present invention accordingly includes photographic developing compositions which comprise a compound of general Formula II together with an alkaline substance, preferably also containing hydroquinone and optionally also containing the additives commonly present in photographic developers.

The following example will serve to illustrate a developer formulation using the compound of the invention:

*Example 4*

The following is a suitable developer composition according to the invention:

| | G. |
|---|---|
| 1-phenyl-4,5-tetramethylene-3-pyrazolidone | 0.26 |
| Sodium sulphite (anhydrous) | 75.0 |
| Hydroquinone | 8.0 |
| Sodium carbonate (anhydrous) | 37.5 |
| Potassium bromide | 2.0 |

Water to make 1000 ml.

For use, one part of this solution is diluted with 2 parts of water.

As noted above it is an especial advantage of the compounds of this invention that they have a higher resistance to hydrolysis than, for example, 1-phenyl-3-pyrazolidone. This results in an increased stability in the developer compositions containing them, and consequential reduced loss of activity on storage. The increased stability is illustrated by the following comparative tests:

A developer solution as described above (A), and a similar developer solution (B) containing as the pyrazolidinone an equivalent quantity (0.19 g.) of 1-phenyl-3-pyrazolidone were each incubated at 50° C. At convenient intervals portions of each developer were used to develop at 20° C. A fast panchromatic silver halide emulsion film and the products were examined simultaneously to determine the effective speed (calculated as the exposure necessary to produce a density 0.1 above the fog level density of the emulsion) and contrast (gamma value) these being the conventional methods of assessing the effectiveness of a developer.

The results obtained are shown in the following table:

INCUBATION TIME (days)

| Developer | | 0 | 6 | 10½ | 18 | 23 |
|---|---|---|---|---|---|---|
| A | Speed | 5.65 | 5.66 | 5.46 | 5.50 | 5.56 |
|   | γ     | 0.75 | 0.67 | 0.76 | 0.64 | 0.81 |
| B | Speed | 5.79 | 5.72 | 5.70 | 5.07 | 4.60 |
|   | γ     | 1.07 | 0.91 | 0.83 | 0.87 | 0.61 |

It will be observed that whereas the developer according to the present invention shows no real loss in speed or change in contrast even after keeping for 23 days at 50° C., the developer containing 1-phenyl-3-pyrazolidone shows a very serious loss in speed and in contrast.

The developers of this invention are accordingly highly advantageous in respect of keeping properties especially under tropical conditions, a result which is highly surprising and certainly could not have been foreseen from any consideration of the chemical structure of the new compounds.

I claim as my invention:

1. A silver halide photographic emulsion developing composition which comprises a compound of the formula:

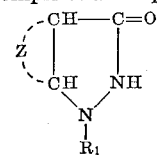

where Z is a grouping selected from the class consisting of trimethylene and tetramethylene groupings and $R_1$ is aryl, together with an alkaline substance.

2. A photographic developing composition according to claim 1 which includes a further developing substance having the property of superadditivity with the compound of the said formula.

3. A photographic developing composition according to claim 1 which includes also hydroquinone.

4. A process for developing a silver halide photographic emulsion which comprises using, as the developing agent, a compound of the formula:

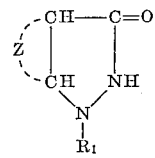

where Z is a grouping selected from the class consisting of trimethylene and tetramethyelne groupings and $R_1$ is aryl.

5. The process of claim 4 wherein the compound is 1-phenyl-4,5-tetramethylene-3-pyrazolidone.

6. The process of claim 4 wherein the compound is 1-m-chlorophenyl-4,5-tetramethylene-3-pyrazolidone.

References Cited by the Examiner

UNITED STATES PATENTS

| 2,673,801 | 3/1954  | Jennen         | 96—55   |
| 2,743,279 | 4/1956  | Reynolds et al.| 260—310 |
| 2,753,265 | 7/1956  | Kendall et al. | 96—66   |
| 2,772,282 | 11/1956 | Allen et al.   | 260—310 |
| 2,823,998 | 2/1958  | Jennen         | 96—9    |
| 3,038,801 | 6/1962  | Alletag        | 96—66   |

OTHER REFERENCES

Alletag, G. C., "Degradation of Phenidone in Developer Solutions During Storage," P.S.E., vol. 2, No. 4, December 1958, pages 213–218.

James, T. H., et al., "The Kinetics of Development by 1-Phenyl-3-Pyrazolidone," P.S.A. Technical Quarterly, vol. 1, No. 3, August 1954, pages 77–80.

NORMAN G. TORCHIN, *Primary Examiner.*

C. E. DAVIS, *Assistant Examiner.*